United States Patent [19]

Chang et al.

[11] Patent Number: 4,638,426
[45] Date of Patent: Jan. 20, 1987

[54] VIRTUAL MEMORY ADDRESS TRANSLATION MECHANISM WITH CONTROLLED DATA PERSISTENCE

[75] Inventors: Albert Chang, Yorktown Heights; John Cocke, Bedford; Mark F. Mergen, Mount Kisco; George Radin, Piermont, all of N.Y.

[73] Assignee: International Business Machines Corporation, Armonk, N.Y.

[21] Appl. No.: 573,975

[22] PCT Filed: Dec. 30, 1982

[86] PCT No.: PCT/US82/01829
§ 371 Date: Sep. 19, 1983
§ 102(e) Date: Sep. 19, 1983

[87] PCT Pub. No.: WO84/02784
PCT Pub. Date: Jul. 19, 1984

[51] Int. Cl.⁴ .............................................. G06F 12/10
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,828,327 | 8/1974 | Berglund et al. | 364/200 |
| 3,942,155 | 3/1976 | Lawlor | 364/200 |
| 4,020,466 | 4/1977 | Cordi et al. | 364/200 |
| 4,037,215 | 7/1977 | Birney et al. | 364/200 |
| 4,042,911 | 8/1977 | Bourke et al. | 364/900 |
| 4,050,094 | 9/1977 | Bourke et al. | 364/200 |
| 4,053,948 | 10/1977 | Hogan et al. | 364/200 |
| 4,057,848 | 11/1977 | Hayashi | 364/200 |
| 4,077,059 | 2/1977 | Cordi et al. | 364/200 |
| 4,084,225 | 4/1978 | Anderson et al. | 364/200 |
| 4,145,738 | 3/1979 | Inoue et al. | 364/200 |
| 4,170,039 | 10/1979 | Beacom et al. | 364/200 |
| 4,215,402 | 7/1980 | Mitchell et al. | 364/200 |
| 4,218,743 | 8/1980 | Hoffman et al. | 364/200 |
| 4,251,860 | 2/1981 | Mitchell et al. | 364/200 |
| 4,490,787 | 12/1984 | Ohya et al. | 364/200 |

OTHER PUBLICATIONS

"The 801 Minicomputer", by George Radin, ACM Sigplan Notices, vol. 17, No. 4, Apr. 1982, pp. 39-47.

Primary Examiner—Gareth D. Shaw
Assistant Examiner—Daniel K. Dorsey
Attorney, Agent, or Firm—Roy R. Schlemmer

[57] ABSTRACT

A memory address translation and related control system for performing the dual functions of converting virtual memory addresses generated by the CPU into real memory addresses in a highly efficient and versatile manner and for controlling certain memory functions such as journalling. The address translation function comprises two steps, the first comprising converting the virtual address into a second virtual address or an effective address and finally the step of converting the effective address into a real memory address. The first step utilizes a set of special registers addressable by a small field to the CPU generated virtual address which converts the virtual address into an expanded form. The second or effective address is then used as the subject of the second or address translation step. To greatly enhance the translation of frequently used virtual addresses, a special set of translation tables referred to herein as a Translation Look-Aside, Buffer (TLB) contain current effective to real address translations for use where frequently referenced addresses are requested. The TLBs are addressed using a subset of the effective address whereupon the contents of the addressed TLB is examined for a match with the effective address. If the addresses match a successful address translation is possible and the real address stored in the address field of the TLB is available for system use. If the desired effective address is not present in the TLB, the page frame tables stored in main memory are accessed and searched for the desired effective address and if found the associated real address is accessed. Further a special data field is provided in both the TLBs and the page frame tables in main memory wherein a bit is provided for each line in the referenced page at a given effective to real address translation which bits may be used to indicate when a line of data has been accessed or altered.

12 Claims, 20 Drawing Figures

SEGMENT REGISTERS

TRANSLATION LOOKASIDE BUFFERS

HASH ANCHOR TABLE / INVERTED PAGE TABLE

REFERENCE AND CHANGE BITS/ADDRESS

I/O BASE REGISTER

RAM SPECIFICATION REGISTER

ROS SPECIFICATION REGISTER

TRANSLATION CONTROL REGISTER

STORAGE EXCEPTION REGISTER

STORAGE EXCEPTION ADDRESS REGISTER

TRANSLATED REAL ADDRESS REGISTER

TRANSACTION IDENTIFICATION REGISTER

SEGMENT REGISTER FORMAT
(ONE OF SIXTEEN)

TLB FORMAT
FIG. 18.1
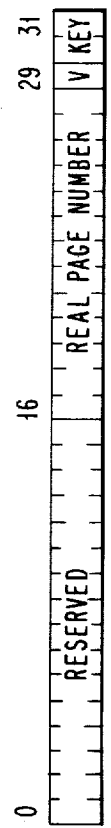
FIG. 18.2
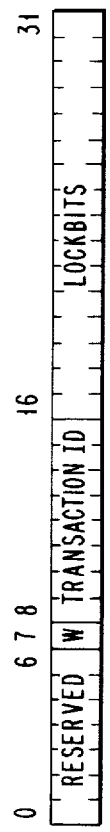
FIG. 18.3

VIRTUAL MEMORY ADDRESS TRANSLATION MECHANISM WITH CONTROLLED DATA PERSISTENCE

BACKGROUND OF THE INVENTION

1. Field of the Invention

The present invention relates generally to computer memory subsystems and more particularly to such a memory subsystem organized into what is known in the art as a virtual memory. Still more particularly, the invention relates to an apparatus for converting virtual addresses into real memory addresses and for effecting certain unique control functions within the memory hierarchy.

In most modern computer system, when a program is executing, it frequently attempts to access data or code which resides somewhere in the system (that is, in some level of the cache/main store/Direct Access Storage Device (DASD) storage hierarchy or even at another node in a distributed system network). For the most primitive system, consider what the program must understand in order to make this access.

Where is the data (or code)? The location will generally determine what kind of address must be used for the access (e.g. main storage address of 24 bits, or sector address on a disk track, or node address in a network). The location will also determine what kinds of instructions must be used to accomplish the access (e.g. Load/Store/Branch for main storage accesses, channel command words for disk accesses, communication protocols for network accesses).

Is this data shared with other program executions? If it is, the access cannot proceed unless certain locks are held. If the changes which this program is about to make to data are not to be seen by others at this time, the Store instruction must be to some private address.

Is this data to be recoverable? If it is, some "journalling" strategy must be implemented so that a consistent prior state of the data can be retrieved when necessary.

Suppose, in this very primitive system, the program was in fact required to make these distinctions at each access. Then the following would result:

If the program is to be generally applicable the accesses would be very slow, even for the most frequent occurrences of "trivial, safe" requests, namely, for private, unrecoverable data in main storage.

If the program were to perform well it would be locked into one accessing mode, so that it would not run correctly against data with different characteristics.

The program would be complex, large and prone to error.

Modern systems have addressed these problems in varying degrees. For instance:

Relocate architectures generally allow private, unrecoverable, nonpersistent data and programs to be addressed uniformly, with an address size of 16 to 32 bits—(usually adequate for temporary computational requirements). When these architectures are implemented with proper "look-aside" hardware, the vast majority of such accesses are accomplished at cache or main storage speeds. Only when this look-aside hardware fails (less than one in one hundred attempts) does the system pay the cost of accessing the relocation table structure. And only when the relocation tables fail (i.e. the data is not in main storage) does the system pay the significant "page fault" overhead. Thus the penalties are paid only when they are really necessary, which is surely the goal of a good architecture and implementation.

When the data is to persist beyond this execution of this program, most modern systems require that, instead of Load/Store/Branch instructions, access be made by explicit requests to software-implemented "access methods." These access methods generally support data which are organized into certain defined aggregates, called "records" and files." The "instructions" to access are usually called "read/write" or "get/put."

This data is not shared or recoverable. It may in fact be in main storage (in some buffer area). But for every access, the program must pay the overhead of these explicit "read/write" calls. Thus access methods, when suitably defined, have resulted in programs which are less complex and more generally usable than in primitive systems, but the performance of these accesses are uniformly poorer than Load/Store, and the data accessed must have been structured into the appropriate aggregate type.

When the data is to be shared or recovered, most modern systems require that explicit requests be made to software-implemented "data-base subsystems." These accesses are generally much slower than those for access methods, not only because of the additional functions of lock and journal management, but also because the kinds of aggregates which these subsystems support (e.g. relations, hierarchies) are themselves more complex.

Again, the data may in fact be more simply structured and in a buffer in main storage, but the overhead must be paid on every access request.

Some systems support the recovery of non-persistent data with a facility called "checkpointing." Now the programmer who wishes to write a recoverable application must deal with three different facilities—checkpointing for computational data, explicit backup for files, and "commit" instructions for data base.

The IBM System/38 has gone farther than most systems in providing at least a uniform addressing structure for all data. But it has done this at the cost of making all addresses very large, many accesses very slow, much storage and hardware required to implement the architecture, and has not yet provided a uniform approach to sharing or recovery.

Various techniques are known in the art whereby a number of computer programs, whether executed by a single essential processing unit or by a plurality of such a processing units, share a single memory. The memory being shared by programs in this manner requires an extremely large parent storage capacity, which capacity is often much larger than the actual capacity of the memory. If, for example, a system employs a 32-bit addressing scheme, $2^{32}$ addressable bytes of virtual storage are available. This virtual storage space is conventionally thought of as being divided into a predetermined number of areas or segments each of which is in turn divided into pages with each page consisting of a predetermined number of lines each in turn having a predetermined number of bytes. Thus segment and page designations or addresses assigned to virtual storage are arbitrary programming designations and are not actual locations in main storage. Therefore, virtual segments and pages are usually randomly located throughout main storage and swap in and out of main storage from backing stores as they are needed.

The random location of segments and pages in main storage necessitates the translation of virtual addresses to actual or real addresses using a set of address translation tables that are located in main storage conventionally referred to as page frame tables. In a large virtual system a great many such address translation tables are employed. These may be organized in a number of different ways. The essential feature of any such organization is that the particular virtual address must logically map to a memory location in said tables which will contain the real address for said virtual address (if one exists).

Functionally, the operation of such address conversion tables is as follows: the high order bits of the particular virtual address are used to access a specific section of said translation tables, which relate to a particular frame or segment, where upon a search is then performed on the lower bits to see if a particular virtual address is contained therein and, if so, what real address is associated therewith. Each page table pointed to by a virtual frame address contains the real locations of all of the pages in one of the frames. Therefore if a particular frame is divided into for example, 16 pages there would be 16 page tables, for each frame, and a separate frame table which would have the entries pointing to a particular set of individual page tables. It should be understood that the above description is generalized in nature and that there are many different ways of organizing the address conversion utilizing the page tables, as well as the means for addressing same, starting with the CPU produced virtual address. In the subsequent description of the preferred form of the invention as set forth and disclosed in the embodiment there will be a detailed description of the hash address tables (HAT) and the inverted page tables (IPT) which, in essence, are functionally organized as set forth above.

When making the actual address translation, regardless of the details of the overall system organization and use of the page tables, the proper entry point into the page-frame tables is made and the page tables are accessed using the presented virtual address as the argument and, usually after a plurality of memory accesses, the desired entry in the page tables is found. At this point a check is usually made to determine if all system protocols have been followed and if so, the real address of the requested page in memory is accessed from the page table. The byte portion of the virtual address or "byte offset" is essentially a relative address and is the same in the virtual page as in the real page whereby once the desired real page address portion of the virtual address has been translated, the byte offset portion is concatenated onto the real page address location to provide the real byte address in main storage.

As is well known in current virtual memory systems, in order to avoid having to translate a virtual address each time the memory is accessed, current translations of recently used virtual addresses to real addresses are retained in a special set of rapidly accessible tables or high speed memories referred to as Directory Look-Aside Tables (DLAT) or Translation Look-Aside Buffers (TLBs) as used in the present invention. These tables or buffers are conventionally special high speed or rapidly accessible memories which may be accessed much faster than the previously described page frame tables whereby frequently used virtual addresses may be stored in this table and accessed very rapidly with the resultant saving of a great deal of execution time within the computer. The efficiency of such TLB address translation systems is predicated upon the fact that, subsequent to the first access to a particular virtual page, there will be a great many accesses to the same page during a given program execution. As indicated above, even though subsequent accesses are to different lines and bytes within a page, the virtual to real page address translation is the same for that page regardless of which line or byte is being addressed.

The use of the TLBs significantly reduces the number translations that must be made (in the page frame tables) and thus has a considerable effect on the performance of the overall virtual memory system.

Another problem with such prior art relocation systems is handling the problem of journalling. That is, maintaining a copy of data in back up storage while a current program is running and using the data. Thus in the event of some hardware or software failure a valid copy of the original data will still be available. This function has been accomplished in the past by complex and time consuming hardware and software routines to provide the requisite journalling function again at the cost of slowing down memory performance.

PRIOR ART

As stated previously, virtual memory systems have been known in the computer arts for many years. It is also well known that the virtual addresses must be translated into real addresses via some sort of relocation or address translation means wherein the translatability of the virtual address into the real memory address must be assured. While it would be impossible to list all patents and articles relating to this subject, the following prior art is intended to be exemplary of typical address translation mechanisms and represents the closest prior art known to the inventors.

U.S. Pat. No. 3,828,327 of Berglund et al describes a prior storage control technique for extending the memory by means of adding a high order bit to the address which high order bit is not part of the program apparent address but is controlled by the different system modes, such as interrupt mode, I/O mode, etc. This patent relates to a memory extension system but is provided together with appropriate address translation hardware. U.S. Pat. No. 4,042,911 of Bourke et al also discloses a system for extending main storage and explicitly includes address translation means therewith. Neither of these two patents disclose the virtual address expansion concept nor the provision of special lock bits in both the TLBs and page frame tables.

An article entitled "The 801 Minicomputer," by George Radin, published in ACM SIGPLAN NOTICES, Vol. 17, No. 4, April 1982, pages 39–47, includes a general description of an experimental computer whose operational characteristics depend to a large extent on a very fast memory subsystem in which the present relocation mechanism would have particular utility.

U.S. Pat. No. 4,050,904 of Bourke et al discloses a memory organization including an address relocation translator which includes among other things stack segmentation registers. The particular segmentation registers disclosed in this patent are for the purpose of storing a real assigned address of a physical block in the main memory rather than for storing an expanded virtual address as utilized with the present invention.

U.S. Pat. No. 4,251,860 of Mitchell et al, discloses a memory addressing system including virtual addressing apparatus for implementing a large virtual address memory. The patent describes a splitting of virtual address into a segment and offset portion however, the segment portion and associated segment registers are used as a convenient way of splitting the address and do not operate in any analogous manner to the address translation scheme of the present invention.

U.S. Pat. No. 4,037,215 of Birney et al, discloses a system very similar to that of the previously referenced U.S. Pat. No. 4,050,094, in that a series of segmentation registers are utilized for pointing to specific real memory blocks. This patent additionally shows the use of 'read only' validity bits tied into the specific segmentation registers. These bits have little analogy to the special purpose lock bits provided in the hardware of the present relocation mechanism.

U.S. Pat. No. 4,077,059 of Cordi et al, discloses a hierarchical memory system which includes the provision of special controls to facilitate journalling and copyback. A plurality of dual memories is involved in this patent wherein the current version of data is kept in one of the memories and changes are noted in the other to facilitate subsequent journalling and copyback operations. The hardware and controls of this patent bear little resemblance to the lock bit system of the present invention.

U.S. Pat. No. 4,053,948 of Hogan et al, discloses an address translation system in which special provisions including a counter are included with each entry in a Directory Look-Aside Table (DLAT).

U.S. Pat. No. 4,218,743 of Hoffman et al is exemplary of a number of patents listed below which relate to the IBM System/38 relocation architecture. This particular patent illustrates a simplification of the manner in which I/O handles addressing in a virtual storage computer system. Other patents related to the subject of the virtual storage system are: U.S. Pat. Nos. 4,170,039, 4,251,860, 4,277,862, 4,215,402.

U.S. Pat. No. 4,020,466 of Cordi et al also discloses a memory system which incorporates a special facilities to facilitate journalling and copyback procedures. The patent has no relationship to the locking bit control means of the present invention.

U.S. Pat. No. 3,942,155 of Lawlor discloses a form of segment partitioning in a virtual memory system, however, the segmenting used in this patent is quite different from the segmenting operation of the present invention which is utilized to expand the virtual address.

U.S. Pat. No. 4,215,402 is cited as exemplary of the use of various hashing schemes for accessing a virtual memory translation mechanism.

SUMMARY OF THE INVENTION

In accordance with the teachings of the present invention, a virtual memory subsystem is provided which takes a pervasive hardware-software approach to the address translation and overall memory control function. All data and programs in the system are addressed uniformly regardless of where they reside, whether they are temporary, catalogued, shared or private, recoverable or not. This means, for example, that the accessing of private, non-recoverable, computational data which is in the cache may be recovered at cache-access speed. However, a further result is that even though data is shared, access by a particular program which holds the key is also at cache speeds.

Thus, the architectural organization of the herein disclosed memory subsystem which permits this type of uniform or "one-level store" addressing includes the provision within the system of a 32-bit virtual address which is issued by the CPU of which address, 4-bits point to a set of sixteen 12-bit segment registes. The contents of the selected segment register are concatenated onto the remaining 28-bits of the virtual address to form a 40-bit effective address. Thus, it may be readily seen that each segment can contain up to $2^{28}$ bytes of data. It should be noted that this new 40 bit address is still a virtual address. It is translated by first accessing a high speed partially associative Translation Look-Aside Buffer to determine if the real address is present and if not, the system, as with other translation systems, then refers to the pages tables to effectuate the address translation.

Another unique feature of the present organization is the provision within both the Translation Look-Aside Buffers and also the page frame table of special purpose lock-bits to check locking, journalling and authorization. It is particularly to be noted that a plurality (16 in the present embodiment) of such lock bits are provided with each real address both in the Translation Look-Aside Buffers and also in the page frame tables. One lock bit is provided for each line within a page and is utilized for the purpose of controlling journalling within the system. Accessing and software means are also provided in the system whereby these bits are accessible to software as well as hardware.

It is a primary object of the present invention to provide a virtual memory subsystem having an extremely large virtual address space.

It is a further object of the invention to provide such a memory subsystem which functions as a "one-level store" for all memory operations.

It is another object of the invention to provide such a memory subsystem which is less prone to addressing errors due to the use of incorrect translation tables.

It is another object of the invention to provide a control mechanism within such a virtual memory subsystem which greatly facilitates journalling and related data protection.

It is another object of the invention to provide such a control mechanism which is available to both the software and hardware.

The foregoing and other objects, features and advantages of the present invention will be apparent from the following description of the preferred embodiment of the invention as illustrated in the accompanying drawings.

DESCRIPTION OF THE DRAWINGS

FIGS. 18.1, 18.2 and 18.3 illustrate diagrammatically the format of three of the fields utilized for each page reference in each of the Translation Look-Aside Buffers. It is noted that there are two separate Translation Look-Aside Buffers in the presently disclosed embodiment and that there are sixteen real page references stored at any one time in each of said buffers.

DESCRIPTION OF THE PREFERRED EMBODIMENT

Figure 1:
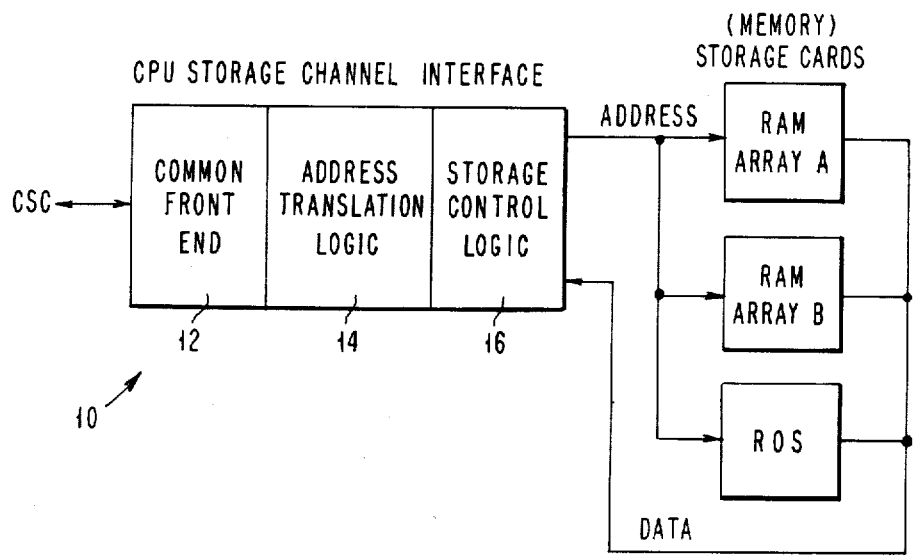
FIG. 1 comprises a functional block diagram of the major portions of the address translation and access control system of the present invention.

The objects of the present invention are accomplished in general by the herein disclosed storage controller that attaches to a host CPU Storage Channel which implements the address translation architecture described in general terms previously, and which will be described in greater detail subsequently. The translating mechanism contains the logic required to interface with up to 16M bytes of storage. Storage can be interleaved or non-interleaved, and static or dynamic. The translation mechanism is functionally divided into three sections (see FIG. 1). The CPU storage channel interface (CSC) 10 logic consists of the Common Front End (CFE), section 12 which provides the proper protocol from the storage channel to the Address Translation Logic 14 and Storage Control Logic 16. All communication to and from the storage channel is handled by this logic. The Address Translation Logic provides the translation from a virtual address received from the storage channel to a real address used to access storage. This logic contains a translation look-aside buffer (TLB) organized as 2-way set associate with 16 congruence classes. Logic is provided that automatically reloads TLB entries from page tables in main storage as required. The Storage Control logic 16 provides the interface from the Address Translation Logic 14 to storage. Dynamic memory refresh control is also provided by this logic.

It should be noted at this point that the present invention relates primarily to the novel structural combination and functional operation of well-known computer circuits, devices and functional units and not in the specific detailed structure thereof. Accordingly, the structure, control, and the arrangement of these well-known circuits, devices and blocks are illustrated in the drawings by the use of readily understandable block representation and functional diagrams that show only these specific details pertinent to the present invention. This is done in order not to obscure the invention with structural details which would be readily apparent to those skilled in the art in view of the functional description of same. Also, various portions of these systems have been appropriately consolidated and functionally described to stress those features pertinent to the present invention. The following description will allow those skilled in the art to appreciate the possibilities and capabilities of the disclosed memory subsystem and further would allow its ready incorporation into any one of a variety of computer architectures.

FIG. 1 illustrates the above described functional portions of the present address translation system which would be appropriately located on a single logic chip in a very large scale integrated circuit technology.

Whether an address is translated (treated as virtual) or treated as real in the present system is controlled by the value of the Translate Mode bit (Tbit) on the CPU Storage Channel (CSC). Each device which places a request on the CSC controls the value of the Translate Mode bit for each request. The T bit is taken from the appropriate field of memory access instruction provided by the CPU. For storage accesses generated by I/O devices, the T bit value is generated by the attaching adapter. When the T bit is one, storage addresses (instruction fetch, data load, data store) are subject to translation. When the T bit is zero, storage addresses are treated as real.

Within the herein disclosed architecture, storage protection is not effective for storage requests which are not subject to translation.

Reference and change recording is effective for all storage requests, regardless of whether they are subject to translation.

For addresses subject to translation, the translation operation logically proceeds as follows.

Various implementations may perform different parts of this function in parallel rather than in strict logical sequence as described subsequently.

The present address translation mechanism implements a "single level storage" addressing structure. The address translation mechanism provides support for the following in the herein disclosed preferred embodiment:

1. Multiple independent virtual address spaces.
2. Address space size of 4 gigabytes.
3. Demand paging.
4. Page size of 2048 or 4096 bytes.
5. Storage protection.
6. Shared segments, for instructions and data.
7. Journalling and locking of 128 bytes lines.
8. Real storage addressability of up to 16 megabytes.
9. Reference and change bits for each real page.
10. Hardware assist for load real address, invalidate TLB entries, and storage exception address.

Storage is treated as if it were mapped onto a single 40-bit virtual address space consisting of 4096 segments of 256 megabytes each. The 32-bit address received from the CSC is converted to a 40-bit ("long form virtual") address by using the four high-order bits to select one of sixteen segment registers, the 12-bit contents of which are concatenated with the remaining 28 bits of the effective address. The translation mechanism then converts the 40-bit virtual address to a real address for storage access. As will be readily appreciated the size of the virtual address can be changed by minor changes to the hardware.

At any given instant, only 4 gigabytes of storage is addressable, namely the sixteen 256 megabyte segments specified by the sixteen segment registers. This fact allows the operating system to create multiple independent virtual address spaces by loading appropriate values into the segment registers. As a limiting case, 256 completely independent 4 gigabyte address spaces could be created in this manner, although it is more likely that some segments (such as nucleus code) would be shared across multiple address spaces.

Storage protection similar to that of the IBM System 370 is provided on a 2K or 4K byte page basis. Store produce and fetch protect are supported, with the protect key (equivalent to the key in the S/370 PSW) specified independently for each 256 megabyte segment.

Support for a Persistent Storage class is provided by a set of "lock bits" associated with each virtual page. The lock bits effectively extend the storage protection granularity to "lines" of storage (128-bytes for 2K pages, or 256-bytes for 4K pages) and allow the operating system to detect and automatically journal changes to Persistent variables. Persistent Storage class as used herein means storage which may reside permanently on disk file storage.

The following terms are used throughout this document and are defined here for clarity and convenience.

Byte Index: A number in the range 0 to 2047 (11 bits) for 2KB pages [or 0 to 4095 (12 bits) for 4KB pages] which identifies a byte within a page or page frame. The Byte Index is taken from the low-order 11 bits [12 bits] of the Effective Address.

Change Bit: A bit associated with each Page Frame which is set to "1" whenever a successful storage reference (write only) is made to that Frame.

Effective Address: The 32-bit storage channel address generated by devices on the storage channel. This can be an address generated by the host CPU for instruction fetch, data load, or data store. It can also be an address generated by an I/O device on the storage channel, such as a DMA address.

Line: A 128-bit portion of a page on a 128-byte boundary. This is the amount of storage controlled by one lockbit.

Lockbit: One of a set of 16 bits associated with each page of a Persistent Storage segment. Each lockbit is associated with one Line of storage. The combination of Transaction ID, the Write bit, and the Lockbit value for a Line determine whether a storage access request is granted or denied in a Persistent Storage segment.

Page: 2048 bytes [or 4096 bytes] of storage on a 2048-byte [4096-byte] boundary. "Page" properly refers to virtual storage while "page frame" refers to real storage, but historically the term "page" has been used for both virtual and real.

Page Frame: 2048 bytes [or 4096 bytes] of storage on a 2048-byte [4096-byte] boundary. Pages reside in Page Frames or on external storage (i.e., disk).

Page Table: The combined hash anchor table inverted page table entries in main storage that are used for translation of a virtual address to the corresponding real address (also referred to herein as HAT/IPT).

Protection Key: A 1-bit value in each Segment Register which indicates the level of authority of the currently-executing process with respect to accessing the data in the given segment. This key is similar in function to the System/370 PSW Key, but is applied individually to each segment rather than globally to all of addressable memory.

Real Address: The result of the translation operation: the Real Page Index (10 to 13 bits) concatenated with the low-order 11 bits [or 12 bits] of the Effective Address. (Real Page Index || Byte Index.)

Real Page Index: A number in the range 0 to 8192 (13 bits) which identifies a page frame in real storage. Some implementations may limit this value to as few as 10 bits, thereby restricting the maximum amount of real storage supported to 2MB of 2KB pages.

Reference Bit: A bit associated with each Page Frame which is set to "1" whenever a successful storage reference (read or write) is made to that Frame.

Segment ID: A number in the range 0 to 4095 (12 bits) which identifies a 256MB virtual storage segment. The Segment ID concatenated with the Virtual Page Index uniquely specifies a page in the 40-bit virtual address space.

Storage Key: A 2-bit value in each TLB entry which indicates the level of protection associated with one particular page. This key is similar in function to the Storage Key associated with each System/370 memory page.

TLB: Translation Lookaside Buffer. The TLB is the hardware containing the virtual-to-real mapping (in some implementations the TLB may contain only a portion of this mapping at any given time). In addition to the mapping each TLB entry contains other information about its associated page, such as Translation ID, Storage Key and Lockbits.

Transaction ID: A number in the range 0 to 255 (8 bits) which identifies the "owner" of the set of Lockbits currently loaded in a TLB entry.

Virtual Address: The 40-bit address value formed inside the present address translation mechanism by concatenation of the Segment ID with the low-order 28 bits of the Effective Address. (That is, Segmemt ID || Virtual Page Index || Byte Index.)

Virtual Page Index: A number in the range 0 to 131,072 (17 bits) for 2KB pages [or 0 to 65,536 (16 bits) for 4KB pages] which identifies a page within a virtual storage segment. The Virtual Page Index is taken from bits 4–20 [4–19] of the Effective Address.

||: Concatenation.

The hardware required to support the present address translation mechanism is described below. Note that some field widths may vary with different implementations.

The TLB consists of an arbitary number of entries, with each entry controlling the translation of the virtual address of one page to its real address.

Details of the organization of the TLB are implementation dependent. Two implementations are possible. A content addressable memory (CAM) which would be addressed by Segment ID || Virtual Page Index and which would contain one entry per real storage frame. The index (ordinal number) of the CAM entry would be equal to the Real Page Index. A set associative TLB which would be addressed by some number of the low-order bits of the Virtual Page Index. The Real Page Index would be contained within a field in the TLB entry.

The only constraint on TLB shape is that a non-CAM implementation must be at least two-way set associative. Each TLB entry can be read and written individually from the CPU using IOR and IOW instructions. TLB entries contain the following fields:

The incoming 32-bit effective address (from the CPU or an I/O device) is first expanded to a 40-bit virtual address by concatenating a segment identifier to the effective address. The virtual address is then presented to the translation hardware for conversion to the equivalent real address. Virtual addresses are translated to a real storage address by the process described below.

Figure 2:
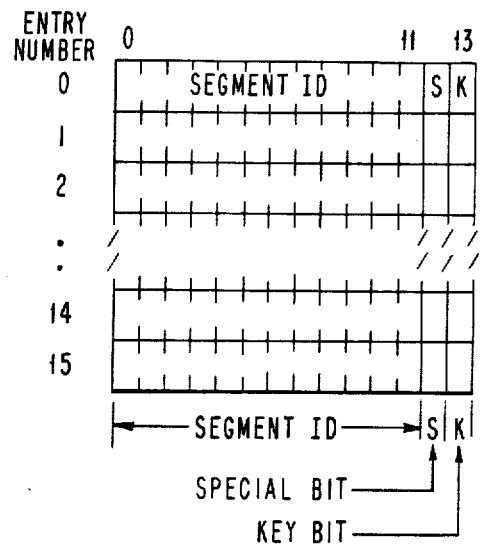
FIG. 2 is a diagrammatic illustration of the format of the Segment Registers used in the present address translation mechanism.

The high-order four bits of the incoming effective address are used to index into the segment table to select one of sixteen segments. A 12-bit segment identifier, a "special segment" bit, and a key bit are obtained from the selected segment register. The 12-bit segment identifier is used for formation of the virtual address. The special segment bit and the key bit are used for access validation as described subsequently. FIG. 2 shows the segment table format.

Figure 3:
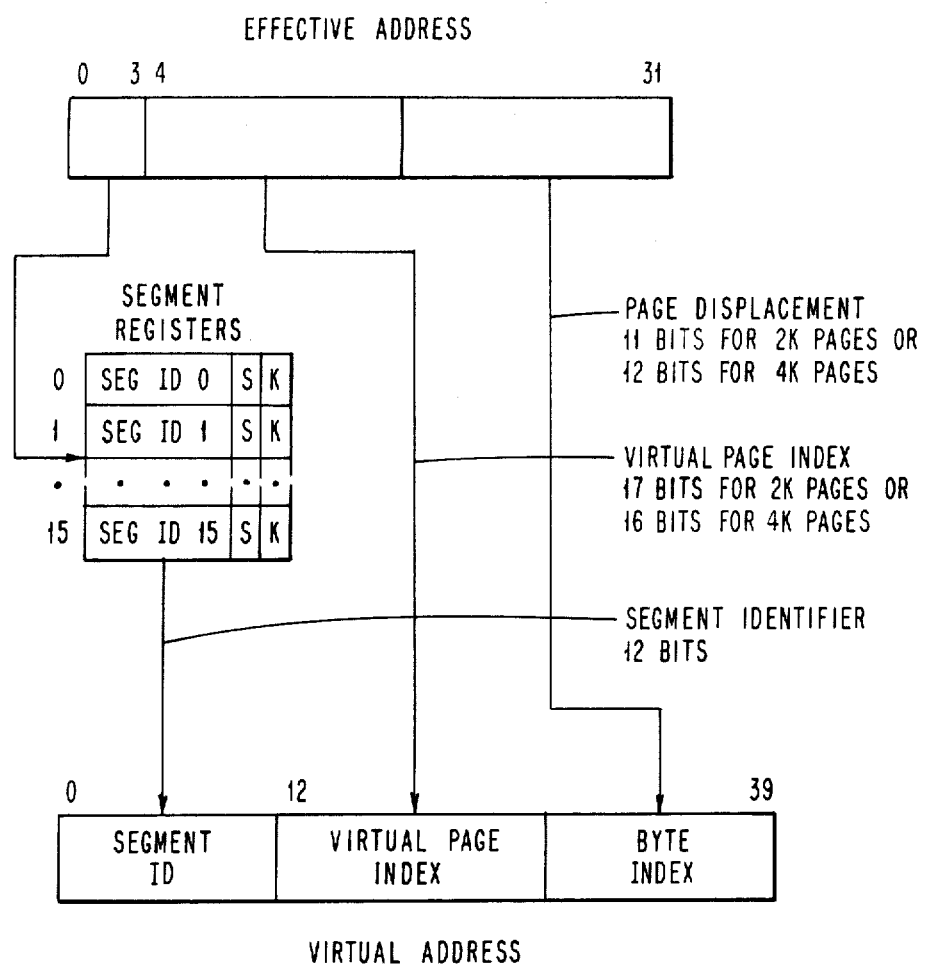
FIG. 3 is a combination functional block diagram and data flow diagram illustrating the conversion of an effective address to a virtual address.

The 12-bit segment identifier is concatenanted with bits 4 through 31 of the incoming effective address to form a 40-bit virtual address. The low order 11 bits for 2K pages, or 12 bits for 4K pages, of the effective address are used as the byte address for the selected real page. These bits are not altered by the translation process. The remaining 29(28) bits of the virtual address are then presented to the translation hardware. FIG. 3 shows the generation of the virtual address using the segment inditifier and the storage effective address.

Figure 4:
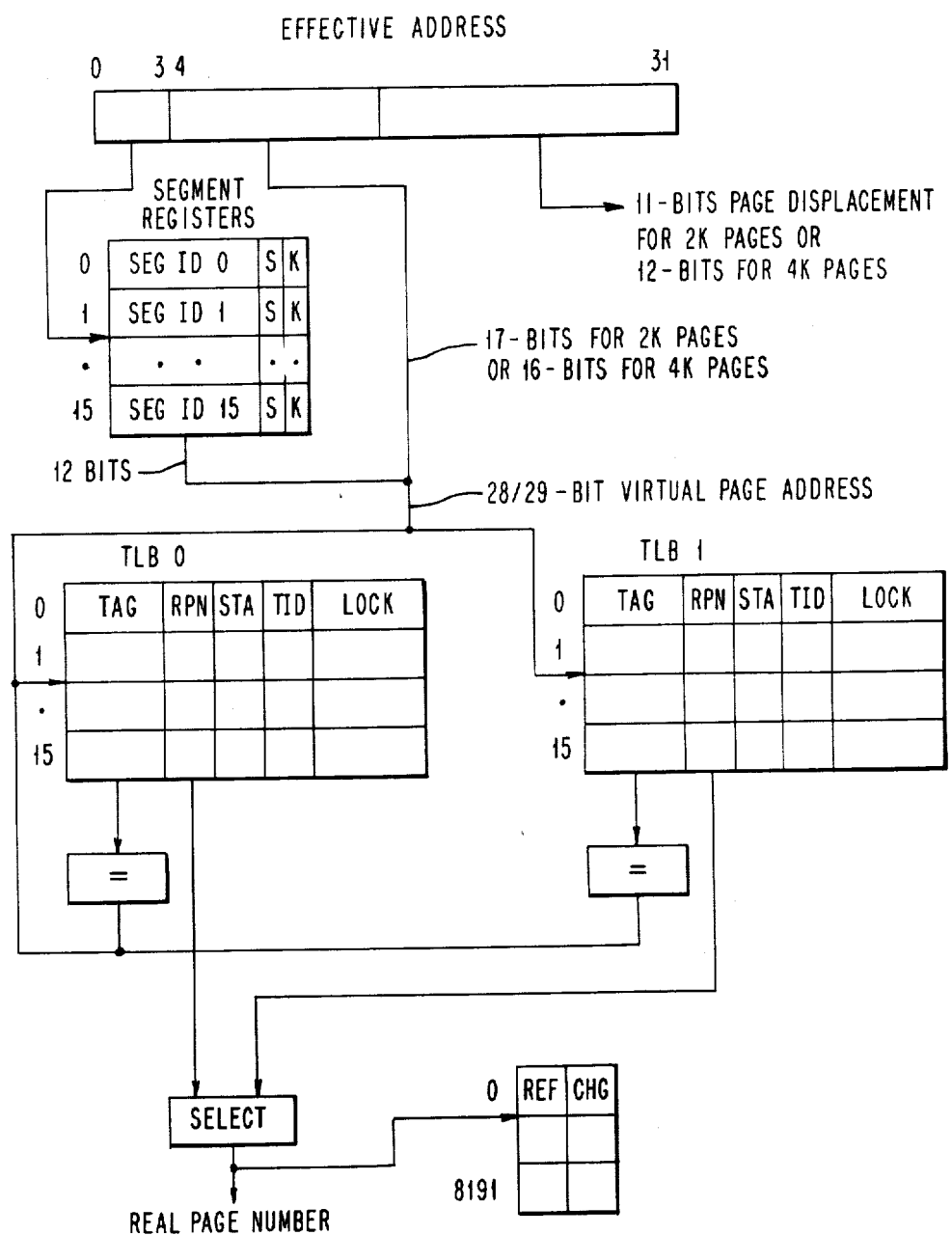
FIG. 4 is a combination functional block diagram and data flow diagram illustrating the complete address translation mechanism from an effective address to real address.
Figure 5:
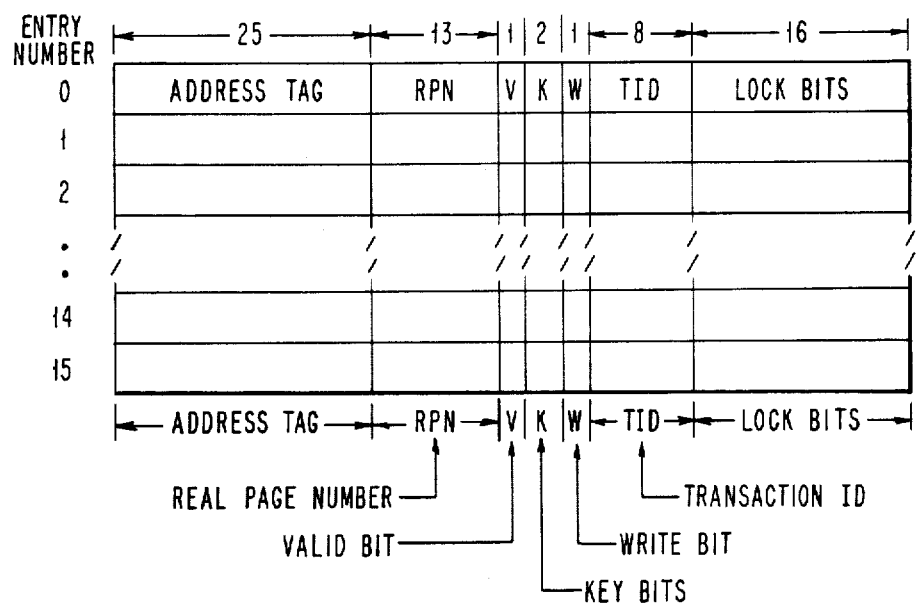
FIG. 5 is a diagram illustrating the organization and contents of the organization of the Translation Look-Aside Buffers as used in the overall address translation mechanism of the present invention.

The herein disclosed address translation system utilizes a Translation Look-aside Buffer (TLB) to contain translations of the most recently used virtual addresses (32 in the present embodiment). Hardware is used to automatically update TLB entires from main storage page tables as new virtual addresses are presented to the TLBs for translation. A simplified data-flow of the translation hardware is shown in FIG. 4 and the format of each TLB is shown in FIG. 5.

The system utilizes two two TLBs with 16 entries per TLB (2-way set associative with 16 congruence classes). The low-order 4 bits of the virtual page index are used to address both TLBs in parallel. The Address Tag entry in each TLB is compared with the segment identifier concatenated with the reamining bits of the virtual page index (25 bits for 2K pages, or 24 bits for 4K pages). If either of the two compares are equal and the TLB entry is valid (as indicated by the Valide Bit), the associated TLB contains the translation information for the given virtual address.

The Real Page Number Field (RPN) in the selected TLM entry contains the number of the real page in main storage that is mapped to the given virtual address. If this is not a special segment, the access is checked for storage protect violations using the Key Bits from the TLB entry and the Key Bit from the Segment Register before the access is allowed. If this is a special segment, as indicated by the Special Bit in the segment register, lockbit processing is performed before the access is allowed. The storage protect facility is described subsequently as is special segment processing. If the access is permited, main storage is then accessed and the reference and change bits associated with the page are updated. The setting of the reference and change bits is also described subsequently.

If no match is obtained from the two TLB compares, the address translation logic will attempt to reload the faulting TLB entry from the page table entries in main storage. The main storage page table is resident in real storage and logically consists of two parts, a Hash Anchor Table (HAT) and an Inverted Page Table (IPT). The HAT allows the mapping of any virtual address, through a hashing function, to any real page.

The Inverted Page Table (IPT) specifies the virtual address (if any) which is associated with each real page frame. It is organized as an array of entries indexed by Real Page Number, with each entry containing its associated Segment ID and Virtual Page Number.

Determining the Virtual Address for a given Real Address is trivial, since the IPT is indexed by Real Page Number. To determine efficiently the Real Address for a given Virtual Address requires a hashing function to map the Virtual Address to an anchor point and a chain of entries to resolve hash collisions as will be well understood by those skilled in the art.

Figure 6:
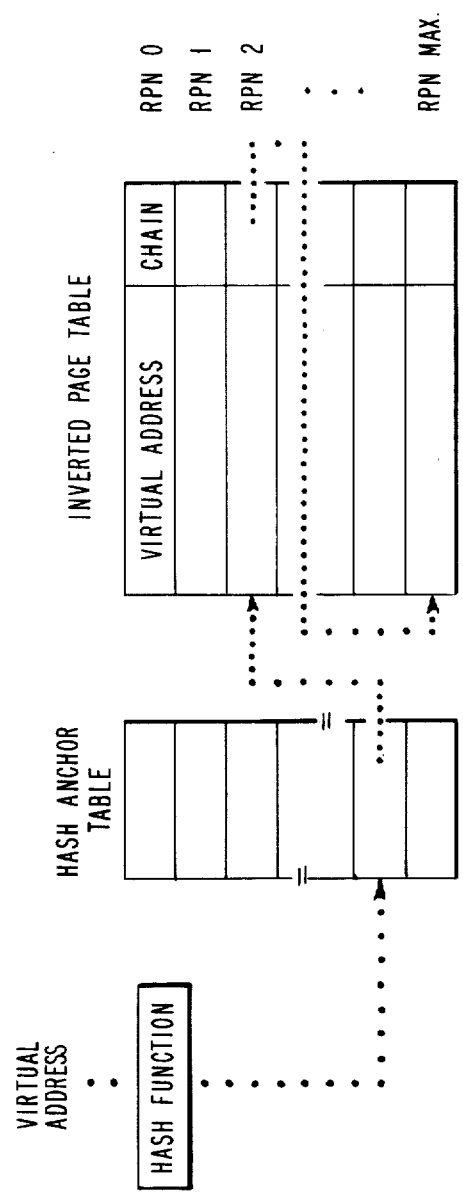
FIG. 6 is a conceptual illustration of the combined Hash Anchor Table/Inverted Page Table and a data flow diagram therefor illustrating the operation of these tables when no TLB entry is found for a given virtual address.

The Hash Anchor Table (HAT) is logically separate from the IPT (though it is physically incorporated into the IPT for hardware efficiency reasons). As shown in FIG. 6, a hash function converts a Virtual Address into the index of an entry in the HAT, which in turn points to the first of a chain of IPT entries (real pages) with the same HAT index. A search of the chain of IPT entires for a match on Virtual Address will yield the IPT index (thus Real Address) for the desired Virtual Address, or will terminate with no match found (page not mapped). In the present embodiment there is one HAT and IPT entry for each page of real storage.

Translation of a virtual to a real address is accomplished by first exclusive or-ing selected low-order bits of the effective address with bits from the segment identifier. This "hashed" address is then used to index into the HAT. The selected HAT entry is a pointer to the beginning of a list of IPT entries to be searched for the given virtual address. Entries in the list of IPT entries to be searched are linked together by a pointer in each entry that points to the next IPT entry to be searched. A flag bit in the IPT entry is used to indicate the end of the search chain. Note that since the hashing function can produce the same HAT address for several different effective addresses, there can be several virtual address entries in the IPT chain to be seached.

Figure 7:
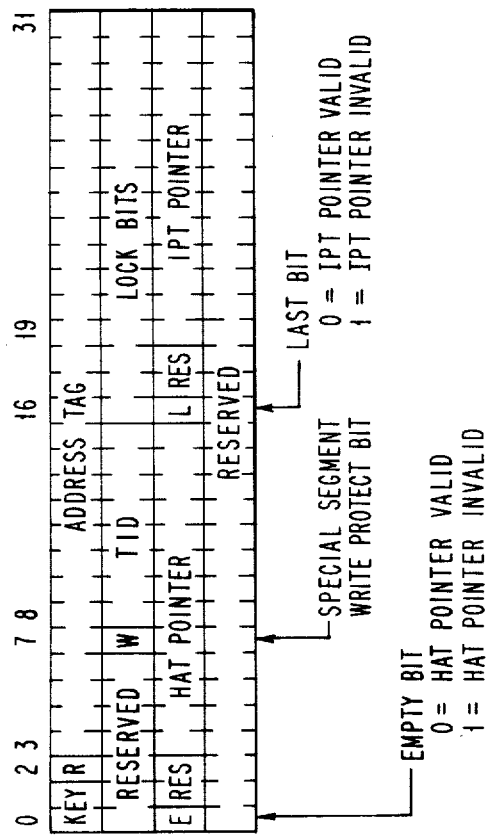
FIG. 7 comprises an illustrative diagram of the structure and contents of the actual Hash Anchor Table/Inverted Page Table as it is stored in memory.

For hardware efficiency reasons, the HAT and IPT are combined into one structure which can be addressed by one indexing structure. There is one entry in the combined HAT and IPT for each page of real storage. For example, 1 megabyte of real storage organized as 2K-byte pages requires 512 entries and 512K bytes organized as 4K-pages requires 128 entries. The format of the combined HAT and IPT entries is shown in FIG. 7. The HAT/IPT contains 16 bytes for each entry and starts on an address that is a multiple of the table size.

The first word in each entry contains the address tag which is composed of the segment identifier concatenated with (||) the virtual page index. Note that for 2K pages the address tag is 29 bits, and for 4K pages it is 28 bits. If a page size 4K is used, the 28-bit address tag is stored in bits [3 thru 30]. Bit 2 is reserved. The first word also contains a 2-bit key which is used for storage protection as described later.

The second word contains the HAT pointer, IPT pointer, and valid bits for each pointer. Use of the pointer is described subsequently.

The third word contains the write protect, lock bits, and TID for special segments. Use of these fields is described subsequently also.

The fourth word is not used for TLB reloading and is reserved for possible future use.

The HAT/IPT base address is a field in the Translation Control Register (described subsequently), and is used for computing the beginning address of the main storage page table. The value contained in the HAT/IPT base address is multiplied by the amount shown in Table 1 depending on storage and page size to obtain the starting address of the main storage page table. Also shown in Table 1, is the size of the HAT/IPT for each storage size and the page size.

TABLE I

| HAT/IPT Base Address Multiplier | | | |
|---|---|---|---|
| Storage SIZE Bytes | Page Size Bytes | HAT/IPT [Entries/Bytes] | HAT/IPT Base Address Multiplier |
| 64K | 2K | 32/512 | 512 |
| 64K | 4K | 16/256 | 256 |
| 128K | 2K | 64/1K | 1024 |
| 128K | 4K | 32/512 | 512 |
| 256K | 2K | 128/2K | 2048 |
| 256K | 4K | 64/1K | 1024 |
| 512K | 2K | 256/4K | 4096 |
| 512K | 4K | 128/2K | 2048 |
| 1 M | 2K | 512/8K | 8192 |
| 1 M | 4K | 256/4K | 4096 |
| 2 M | 2K | 1024/16K | 16384 |
| 2 M | 4K | 512/8K | 8192 |
| 4 M | 2K | 2048/32K | 32768 |
| 4 M | 4K | 1024/16K | 16384 |
| 8 M | 2K | 4096/64K | 65536 |
| 8 M | 4K | 2048/32K | 32768 |
| 16 M | 2K | 8192/128K | 131072 |
| 16 M | 4K | 4096/64K | 65536 |

HAT ADDRESS GENERATION

As stated previously the HAT index is computed by exclusive or-ing selected bits from the segment identifier with bits from the effective address. The number of bits used is chosen so that the resulting index will select one of n entries in the HAT/IPT. This hashing operation is shown in FIG. 6. The bits used for generation of the HAT index are listed in Table II. The storage address of the selected HAT entry is computed as: HAT/IPT Base Address+HAT Index || 0100.

The selected HAT entry is accessed and the Empty Bit checked to determine if the IPT search chain is empty. If the Empty Bit is one, there is no page mapped to the given virtual address and a "page fault" is reported as described later. If the Empty Bit is zero, entries in the IPT search chain exist and entries in the IPT are searched. The HAT Pointer field of the selected HAT entry is then used as a pointer to the start of the IPT search chain.

TABLE II

| HAT/IPT Index Generation Source Fields | | | | |
|---|---|---|---|---|
| Storage Size Bytes | Page Size Bytes | Segment Register Bits | Effective Address Bits | Index [# Bits] |
| 64K | 2K | 7:11 | 16:20 | 5 |
| 64K | 4K | 8:11 | 16:19 | 4 |
| 128K | 2K | 6:11 | 15:20 | 6 |
| 128K | 4K | 7:11 | 15:19 | 5 |
| 256K | 2K | 5:11 | 14:20 | 7 |
| 256K | 4K | 6:11 | 14:19 | 6 |
| 512K | 2K | 4:11 | 13:20 | 8 |
| 512K | 4K | 5:11 | 13:19 | 7 |
| 1 M | 2K | 3:11 | 12:20 | 9 |
| 1 M | 4K | 4:11 | 12:19 | 8 |
| 2 M | 2K | 2:11 | 11:20 | 10 |
| 2 M | 4K | 3:11 | 11:19 | 9 |
| 4 M | 2K | 1:11 | 10:20 | 11 |
| 4 M | 4K | 2:11 | 10:19 | 10 |

TABLE II-continued

| HAT/IPT Index Generation Source Fields | | | | |
|---|---|---|---|---|
| Storage Size Bytes | Page Size Bytes | Segment Register Bits | Effective Address Bits | Index [# Bits] |
| 8 M | 2K | 0:11 | 9:20 | 12 |
| 8 M | 4K | 1:11 | 9:19 | 11 |
| 16 M | 2K | 0 || 0:11 | 8:20 | 13 |
| 16 M | 4K | 0:11 | 8:19 | 12 |

The HAT pointer previously accessed is used as the starting index into the IPT. The storage address of the first IPT entry is computed as: HAT/IPT Base Address+HAT Pointer || 0000.

An access is made to the first entry in the IPT and the address tag compared to the given virtual addres. If the two are equal, the real page assigned to the virtual address has been located and the faulting TLB entry can be reloaded. Reloading of the TLB entry will be described subsequently. If the two are not equal, the IPT search continues by accessing the IPT pointer. The IPT pointer address is computed as: HAT/IPT Base Address+HAT Pointer || 0100. The IPT pointer is then accessed and the Last Bit checked to determine if there are additional entries in the IPT search chain. If the Last Bit is a zero, there are additional entries and the search process continues. If the Last Bit is a one, there are no additional IPT entries to be searched, and a "page fault" is reported.

If there are additional IPT entries to be searched, the address of the next IPT entry for searching is computed as: HAT/IPT Base Address+IPT Pointer 0000. This address is used to access the next entry in the IPT search chain and the address tag contained in the selected entry is compared to the given virtual address. If the two are equal, the real page assigned to the virtual address has been located and the faulting TLB entry can be reloaded. If the two are not equal, the search process continues by accessing the pointer to the next entry to be searched. The address of the pointer to the next entry is computed as: HAT/IPT Base Address+IPT Pointer || 0100. This word is then accessed and the Last Bit is checked to determine if there are additional entries in the IPT search chain. If the Last Bit is a one, there are no additional IPT entries to be searched, and a "page fault" is reported. If the Last Bit is a zero, there are additional entries and the search process continues. The current IPT Pointer is used to access subsequent entries using the previously described process, until either the address tag in the IPT entry is equal to the given virtual address, or no match is found and the Last Bit indicates no further entries exist in the search chain.

The following is a synopsis of the steps to be followed to convert a Virtual Address to the index of its IPT entry (and thus to its corresponding Real Address).

(1) Select the low-order 13 bits of the Virtual Page Number. This will be bits 7-9 of the Effective Address if 4KB pages are used, or bits 8-20 if 2KB pages are used.

(2) Select the 12-bit contents of the Segment Register specified by bits 0-3 of the Effective Address. Concatenate a '0' bit on the left to form a 13-bit field.

(3) Exclusive-OR the two 13-bit fields from steps (1) and (2) to form a 13-bit Hash Anchor Table entry number.

(4) Shift the value from step (3) left 4 bits. This forms the byte offset of the start of the IPT entry which physically contains the desired HAT entry.

(5) Compute the address of the HAT/IPT entry. This is done by adding the result of step (4) to the starting address of the IPT. If the IPT is constrained to start on an appropriate power-of-two byte boundary, the "add" may be replaced by OR or concatenation.

(6) Check for empty IPT chain. Investigate the "E" ("empty") bit in the HAT/IPT entry. If E=1 then the IPT chain is empty (HAT pointer is invalid): the search terminates unsuccessfully; the virtual page is not mapped.

(7) If the IPT chain is not empty, select the HAT Pointer from the address HAT/IPT entry. This 13-bit value is the index of the first IPT entry in the chain of entries having the same hash result [step (3)].

(8) Shift the IPT index value left 4 bits. This forms the byte offset of the start of an IPT entry which is to be checked for a match on Virtual Address.

(9) Compute the address of the IPT entry. This is done by adding the result of step (8) to the starting address of the IPT. If the IPT is constrained to start on an appropriate power-of-two byte boundary, the "add" may be replaced by OR or concatenation.

(10) Compare the Virtual Address match. Compare the Segment ID || Virtual Page Number from the IPT entry (28 or 29 bits with the segment register contents specified by the Effective Address [step (2)] concatenated with the Virtual Page Number in the Effective Address.

(11) If a match, search has completed successfully. This entry is the one corresponding to the desired Virtual Address; its index number is equal to the required Real Page Number.

(12) If not a match, check for end-of-chain. Investigate the "L" ("last") bit in the IPT entry. If L=1 then this is the last IPT entry in this chain: the search terminates unsuccessfully; the virtual page is not mapped.

(13) If not end-of-chain, slect the IPT Pointer field from the IPT entry. This 13-bit value is the index of the next IPT entry to be investigated.

(14) Go to Step (8).

TLB Reload

If an IPT entry is found with an address tag field equal to the given virtual address, the faulting TLB entry is reloaded. Reloading consists of selecting the least recently used TLB entry for the congruence class of the faulting virtual address, and loading the selected entry with the given virtual address tag field, the corresponding real page number and the key bits. If this is a special segment as indicated by the Special Bit in the segment register, then the Write Bit, TID, and LOCK bits are also reloaded.

Hardware is used to determine the least recently used TLB entry in each congruence class. Since the low-order bits of the virtual address determine the congruence class, the only decision to be made is which TLB should have the selected entry replaced. One of the two TLBs will then be selected based on which TLB contained the entry in the given congruence class that was least recently referenced.

Once the least recently used TLB entry for the given congruence class has been determined, the selected TLB entry can be reloaded. The Address Tag Field and Key bits are reloaded from the IPT entry contained in main storage. The address of this entry was previously computed in the IPT search process. Since the IPT index computed in the search process is equal to the real page number, this value is used to reload the Real Page Number field in the TLB. If this is a special segment, as indicated by the Special Bit in the segment register, the TID and Lock Bits are also reloaded. The TID and Lock Bits are reloaded by accessing the third word in the selected IPT entry.

STORAGE ACCESS CONTROL

The present address translation mechanism provides two access control facilities. The first facility applies to non-special segments and provides read/write protection for each page of real storage. The second facility applies only to special segments and is used to support persistent data types. These access control facilities apply only to translated accesses. If a violation is detected by either facility, the storage access is terminated and an exception reported as described subsequently.

STORAGE PROTECTION PROCESSING

Storage protection processing applies only to non-special segments. Once a correspondence between a virtual and a real address has been determined by the TLB, the requested access is verified to insure proper access authority. This facility allows each page to be marked as no access, read only, or read/write.

Access control is a function of the one-bit protection key in the selected Segment Register, the two-bit key in the TLB entry, and whether the access is a load or store operation. Access is controlled as shown in Table III.

TABLE III

| | Protection Key Processing | | |
|---|---|---|---|
| Key in TLB | Protect Key in Seg Reg | Access Permitted | |
| | | Load | Store |
| 00 | 0 | Yes | Yes |
| | 1 | No | No |
| 01 | 0 | Yes | Yes |
| | 1 | Yes | No |
| 10 | 0 | Yes | Yes |
| | 1 | Yes | Yes |
| 11 | 0 | Yes | No |
| | 1 | Yes | No |

If the access is not allowed, then the translation is terminated, and a Protection exception is reported to the CPU.

LOCKBIT PROCESSING

Lockbit processing is applied only to special segments as indicated by the Special bit in the selected segment register. Special segments are used to support Persistent data. Lockbit processing allows the operating system to automatically monitor changes to Persistent variables and to journal changes, create shadow pages, and perform other processing required for data base consistency. Lockbits also extend the protection from the page size resolution (either 2K or 4K-bytes) provided by the storage protect facility to lines of either 128 or 256 bytes. A resolution of 128 bytes is provided for 2K pages, and 256 bytes for 4K bytes. The individual line lockbit is selected by bits [21:24] of the effective address for 2K pages, and bits [20:23] for 4K pages.

Access control is a function of the one-bit write key in the selected TLB entry, the lockbit value of the selected line, the TID compare, and whether the access is a load or store operation. Access is controlled as shown in Table IV following.

TABLE IV

| Current TID Compared To TID in TLB | Lockbit Processing | | Access Permitted | |
|---|---|---|---|---|
| | Write Bit in TLB | Lockbit Value for Selected Line | Load | Store |
| Equal | 1 | 1 | Yes | Yes |
| | | 0 | Yes | No |
| | 0 | 1 | Yes | No |
| | | 0 | No | No |
| Not Equal | — | — | No | No |

The Data storage exception is used to report a lockbit violation. This violation may not represent an error; it may be simply an indication that a newly modified line must be processed by the operating system.

Reference and change bits are provided for each page of real storage. These bits are in arrays external to the present address translation mechanism and are updated as required for each storage access. The reference bit is set to one if the corresponding real page is accessed for either a read or write operation. The change bit is set if the corresponding page is written.

Reference and change bits are accessible via I/O read and write instructions (IOR and IOW) from the associated CPU. Reference and change bits for each page of real storage start at the I/O address specified by the I/O Base Address Register plus X'1000'. The I/O address of the reference and change bits for a given page is given by the following expression.

I/O Address = Address Specified by I/O Base

Address Register

+ X'1001'

+ Page Number

Figure 8:
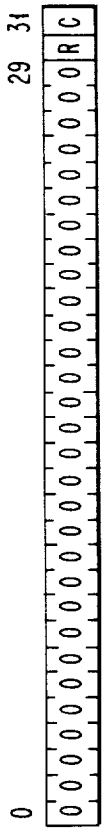
FIG. 8 illustrates the format of the reference and change bits as utilized with each I/O address.

Each I/O address contains the reference and change bits for one page of real storage. The format of the reference and change bits is shown in FIG. 8.

Data transferred by accesses to reference and change bits is defined as follows:

Bits 0:29: Zeros.
Bit 30: Reference Bit. Set to one when the corresponding real page is accessed for a read or write operation.
Bit 31: Change Bit. Set to one when the corresponding real page is accessed for a write operation.

Reference and change bits are not initialized by hardware. They are initialized and cleared by system software via IOW instructions. Since reference and change bits can be set by execution of a program to set or clear the reference and change bits, a write to clear or set reference and change bits followed by a read, will not necessarily read the same data which was written.

CONTROL REGISTERS

There are a number of control registers used for defining the storage configuration, page table address, and I/O base address. These registers are initialized (loaded) by system software via I/O read and I/O write (IOR and IOW) instructions from the CPU. Their organization and format are shown in FIGS. 9 through 18. These registers are accessible only from supervisor state.

Figure 9:
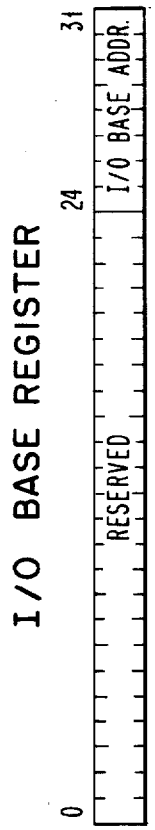
FIG. 9 is a diagrammatic illustration of the I/O Base Address Register configuration.

The I/O Base Address Register specifies which 64K block of I/O addresses are assigned to the translation system. The I/O base address is equal to the value contained in the I/O Base Address Register multiplied by 65536 (x'10000'). The format of the I/O Base Address Register is shown in FIG. 9.

The I/O Base Address Register is defined as follows:

Bits 0.23: Reserved.
Bits 24:31: I/O Base Address. This 8-bit value defines which 64K byte block of I/O addresses are assigned to the translation system (i.e. these 8 bits are the most significant 8 bits) in the I/O address recognized by the translation system.

Figure 10:
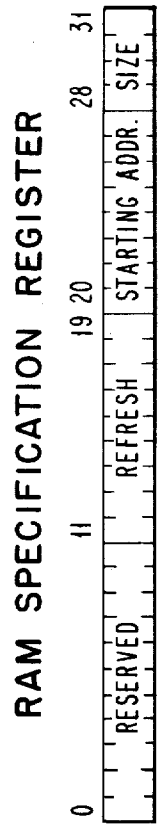
FIG. 10 is a diagrammatic illustration of the format of the RAM Specification Register.

The "RAM Specification Register" defines the RAM size, RAM starting address, refresh rate, and wheter parity checking or Error Correcting Code (ECC) is used. ECC and parity checking features do not form a part of the present invention and, other than mentioning facilities provided for their handling, will not be described further. The format of the RAM Specification Register is shown in FIG. 10.

The RAM Specification Register is defined as follows:

Bits 0:10: Reserved.
Bits 10:18: Refresh Rate. This 9-bit quantity determines the refresh cycle rate. The refresh cycle rate is equal to the value contained in bits [10:18] multiplied by the CPU clock frequency. A Refresh Rate of zero disables refresh. The refresh rate value can be computed by dividing the required memory refresh rate by the CPU clock frequency. For example, in a system with dynamic memory the requires refreshing 128 rows every 2 msec., the refresh interval per row is 128/2 msec., which is 15.6 $\mu$sec. For a 200 nsec. CPU clock, the required refresh rate count is 15.6 $\mu$sec/200 nsec., which is 78 (X'04E'). This requires loading the Refresh Rate with X'04E'.

The Refresh Rate is initialized to X'01A' as part of the POR sequence.

Bits 20:27: RAM Starting Address. This eight-bit field defines the starting address of RAM for both translated and non-translated accesses. For translated accesses, RAM will be selected if the translated address is within the range specified by the RAM Starting Address and RAM Size. For non-translated accesses, the RAM Starting Address is used in conjunction with RAM Size to determine if an address is within the address range specified for this storage controller. The starting address of RAM is defined to be a binary multiple of the RAM size, and is computed by multiplying the bits indicated in Table V below by the value specified by RAM Size.

TABLE V

| RAM Size | Bits | | | | | | | | Multiplier |
|---|---|---|---|---|---|---|---|---|---|
| | 20 | 21 | 22 | 23 | 24 | 25 | 26 | 27 | |
| 64K | X | X | X | X | X | X | X | X | 64K |
| 128K | X | X | X | X | X | X | X | — | 128K |
| 256K | X | X | X | X | X | X | — | — | 256K |
| 512K | X | X | X | X | X | — | — | — | 512K |
| 1 M | X | X | X | X | — | — | — | — | 1 M |
| 2 M | X | X | X | — | — | — | — | — | 2 M |
| 4 M | X | X | — | — | — | — | — | — | 4 M |
| 8 M | X | — | — | — | — | — | — | — | 8 M |

TABLE V-continued

| RAM Size | 20 | 21 | 22 | 23 | Bits 24 | 25 | 26 | 27 | Multiplier |
|---|---|---|---|---|---|---|---|---|---|
| 16 M | — | — | — | — | — | — | — | — | 16 M |

X = bit used in address calculation
— = bit not used in address calculation

For example, if a storage size of 256K is specified, bits [20:25] specify which one of 64 256K-byte boundaries is the RAM starting address. If bits [20:25] are 011101, the RAM starting address is X'00740000'. If a RAM size of 1M byte is specified, bits [20:23] specify which one of sixteen 1M-byte boundaries is the RAM starting address. If bits [20:23] are 1001, the RAM starting address is X'00900000'.

Bits 28:31: RAM Size. This four-bit field defines the size of the RAM attached to the present translation system. RAM size is selectable from 64K bytes to 16M bytes as defined in Table VI below.

TABLE VI

| Bits 28:31 | RAM Size |
|---|---|
| 0000 | No RAM |
| 0001 thru 0111 | 64K |
| 1000 | 128K |
| 1001 | 256K |
| 1010 | 512K |
| 1011 | 1 M |
| 1100 | 2 M |
| 1101 | 4 M |
| 1110 | 8 M |
| 1111 | 16 M |

ROS SPECIFICATION REGISTER

Figure 11:
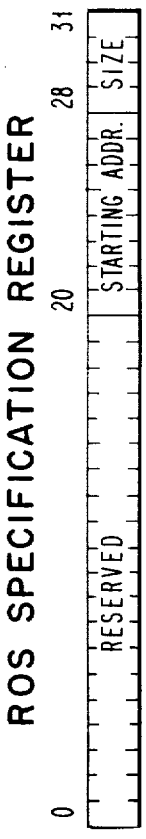
FIG. 11 is a diagrammatic illustration of the format of the ROS Specification Register.

The ROS Specification Register defines the ROS starting address, ROS size, and whether parity is provided by ROS. ROS can be accessed in both translated and non-translated mode. The format of the ROS Specification Register is shown in FIG. 11.

The ROS Specification Register is defined as follows:

Bits 0.19: Reserved.
Bits 20:27: ROS Starting Address. This eight-bit field defines the starting address of ROS for both translated and non-translated accesses. For translated accesses, ROS will be selected if the translated address is within the range specified by the ROS Starting Address and ROS Size. For non-translated accesses, the ROS Starting Address is used in conjunction with ROS Size to determine if an address is within the address range specified for this storage controller. The starting address of ROS is defined to be a binary multiple of the ROS size, and is computed by multiplying the bits indicated in Table VII below by the value specified by ROS Size.

TABLE VII

| ROS Size | 20 | 21 | 22 | 23 | Bits 24 | 25 | 26 | 27 | Multiplier |
|---|---|---|---|---|---|---|---|---|---|
| 64K | X | X | X | X | X | X | X | X | 64K |
| 128K | X | X | X | X | X | X | X | — | 128K |
| 256 M | X | X | X | X | X | X | — | — | 256K |
| 512K | X | X | X | X | X | — | — | — | 512K |
| 1 M | X | X | X | X | — | — | — | — | 1 M |
| 2 M | X | X | X | — | — | — | — | — | 2 M |
| 4 M | X | X | — | — | — | — | — | — | 4 M |

TABLE VII-continued

| ROS Size | 20 | 21 | 22 | 23 | Bits 24 | 25 | 26 | 27 | Multiplier |
|---|---|---|---|---|---|---|---|---|---|
| 8 M | X | — | — | — | — | — | — | — | 8 M |
| 16 M | — | — | — | — | — | — | — | — | 16 M |

X = bit used in address calculation
— = bit not used in address calculation

For example, if a ROS size of 64K is specified, bits [20:27] specify which one of 256 64K-byte boundaries is the ROS starting address. If bits [20:27] are 110010, the ROS starting address is X'00C80000'.

Bits 28:31: ROS Size. This four bit field defines the size of ROS attached to the translation system. ROS size is selectable from 64K bytes to 64M bytes as defined in Table VIII below. If ROS is not used, bits [28:31] are set to zero.

TABLE VIII

| Bits 28:31 | ROS Size |
|---|---|
| 0000 | No ROS |
| 0001 thru 0111 | 64K |
| 1000 | 128K |
| 1001 | 256K |
| 1010 | 512K |
| 1011 | 1 M |
| 1100 | 2 M |
| 1101 | 4 M |
| 1110 | 8 M |
| 1111 | 16 M |

TRANSLATION CONTROL REGISTER

Figure 12:
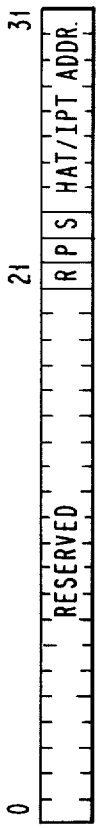
FIG. 12 is a diagrammatic illustration of the format of the Translation Control Register.

The Translation Control Register (TCR) specifies if interrupts are generated on successful hardware TLB reload, if parity is used on the reference and change array, the size of each page (either 2K or 4K-bytes), and the starting address of the main storage page table (combined HAT and IPT). The format of the Translation Control Register is shown in FIG. 12.

The Translation Control Register is defined as follows:

Bits 0:20: Reserved.
Bit 21: Enable Interrupt on Successful TLB Reload. This bit is used to enable reporting of successful hardware TLB reloading. When set to one, a successful hardware TLB reload will cause an exception reply to be generated, and the TLB Reload bit (bit 22) in the SER to be set to one. When Enable Interrupt On Successful TLB Reload is set to zero, successful hardware reloading of TLB entries is not reported. This facility can be used for software performance measurement of the TLBs.
Bit 22: Reference and Change Array Parity Enable. This bit is used to indicate if parity is used on the external reference and change array. If this bit is set to one, parity is used on the reference and change array.
Bit 23: Page Size. A value of zero is used for 2K-byte pages, and a value of one is used for 4K-byte pages.
Bits 24:31: HAT/IPT Base Address. This 8-bit field is used to specify the starting address of HAT/IPT entries in main storage. The value contained in this field is multiplied by a constant determined by the size of a real storage and the page size, to determine the starting address of the HAT/IPT entries. For a page size of 2K bytes, the base address is specified by bits [24:31], and for 4K pages by bits [25:31]. The constant for each storage size and page size configuration is listed in Table I.

The Storage Exception Register (SER) is used to report errors in the translation process, and system errors, for a storage access. Individual bits are provided to report each error condition detected by the translation system. In the case of multiple errors, each error is reported by the setting of the appropriate bit. Bits which were set by previous errors are not reset by subsequent errors.

Figure 13:
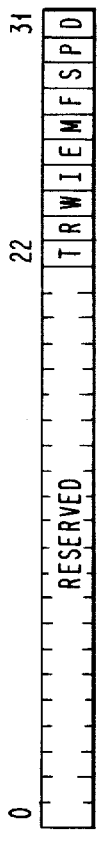
FIG. 13 is a diagrammatic illustration of the format of the Storage Exception Register.

The SER is initialized to zero by the POR sequence. Once an exception is reported, system software is responsible for clearing the SER after the exception has been processed. For format of the Storage Exception Register is shown in FIG. 13.

The Storage Exception Register is defined as follows:

Bits 0.21: Reserved.

Bit 22: Successful TLB Reload. This bit is set to one when Interrupt On Successful TLB entry is successfully reloaded.

Bit 23: Reference And Change Array Parity Error. This bit is set to one when a parity error is detected in the reference and change array.

Bit 24: Write to ROS Attempted. This bit is set to one when an attempt is made to write to an address contained in the ROS address space.

Bit 25: IPT Specification Error. This bit is set to one when an infinite loop is detected in the IPT search chain. An infinite loop can be created by a system software error which incorrectly specifies IPT pointer values that result in an IPT pointer pointing to a previous entry in the current IPT search chain (an infinite loop).

Bit 26: External Device Exception. This bit is set to one when an exception is caused by a device on the RSC other than ROMP.

Bit 27: Multiple Exception. This bit is set to one when more than one exception (IPT Specification Error, Page Fault, Specification, Protection, or Data) has occurred before the exception indication has been cleared in the Storage Exception Register.

This bit normally indicates that system software has failed to process an exception. However, if an exception is caused by a Load Multiple (LM) or Storage Multiple (STM) instruction, this bit can be set since the LM or STM instruction will attempt to load or store all of the registers specified in the instruction before the instruction is terminated due to an exception.

Bit 28: Page Fault. This bit is set to one when translation is terminated because no TLB entry or main storage page table entry contains the translation for a virtual address.

Bit 29: Specification. This bit is set to one when translation is terminated because two TLB entries were found for the same virtual address.

Bit 30: Protection. This bit is set to one when translation is terminated because Storage Protection processing for a non-special segment determines that a storage access is not allowed.

Bit 31: Data. This bit is set to one when translation is terminated because Transaction ID/Lockbit processing for a special segment determines that a storage access is not allowed.

Figure 14:
FIG. 14 is a diagrammatic illustration of the format of the Storage Exception Address Register.

The Storage Exception Address Register (SEAR) contains the effective storage address causing the exception reported by the Storage Exception Register (SER) for data load and store requests from the CPU. The SEAR is not loaded for exceptions caused by ROMP instructions fetches, or by external device. The format of the Storage Exception Address Register is shown in FIG. 14.

The Storage Exception Address Register is defined as follows:

Bits 0.31: Storage Exception Address. The 32-bit effective storage address causing the exception reported by the SER. In the case of multiple errors (bit 27 of the SER set to one), the address contained in the SEAR is the address of the oldest exception.

Figure 15:
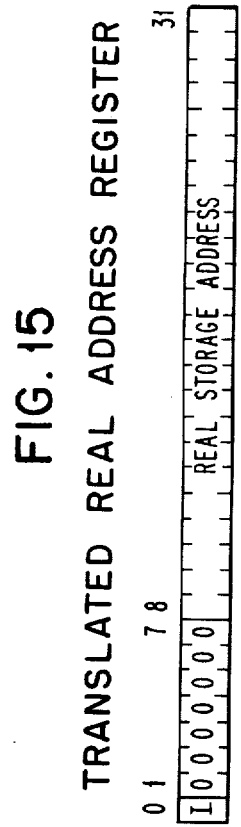
FIG. 15 is a diagrammatic illustration of the format of the Translated Real Address Register.

The Translated Real Address Register (TRAR) contains the real storage address determined by the Compute Real Address operation. The Compute Real Address function is used to determine if a virtual address is currently mapped in real storage, and the corresponding real address of the virtual address is mapped. The Compute Real Address function is described subsequently. The format of the Translated Real Address Register is shown in FIG. 15.

The Translated Real Address Register is defined as follows:

Bit 0: Invalid Bit. This bit is set to one if the translation failed, and is set to zero if the translation is successful.

Bits 1:7: Zeros. This seven-bit field is always zero.

Bits 8:31: Real Storage Address. This 24-bit field contains the real storage address mapped to the given virtual address if translation was successful. This field is set to zero if translation failed.

Figure 16:
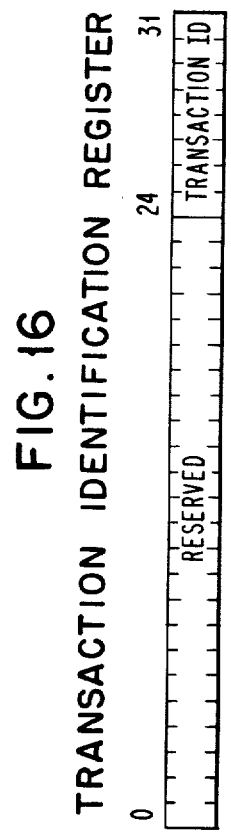
FIG. 16 is a diagrammatic illustration of the format of the Transaction Identifier Register.

The Transaction Identifier Register (TID) contains the eight-bit identifier of the task currently defined as the "owner" of special segments. If a segment is defined as a special segment by the Special Bit in the selected segment register, then lockbit processing as described in Section 6.2 applies to the storage access. Lockbit processing uses the value contained in the TID and compares it against the TID entry in the TLB to determine if the storage access is permitted. The format of the Transaction Identifier Register is shown in FIG. 16.

The transaction Identifier Register is defined as follows:

Bits 0.23: Reserved.

Bits 24:31: Transaction Identifier. This eight-bit value specifies the owner of special segments.

Figure 17:
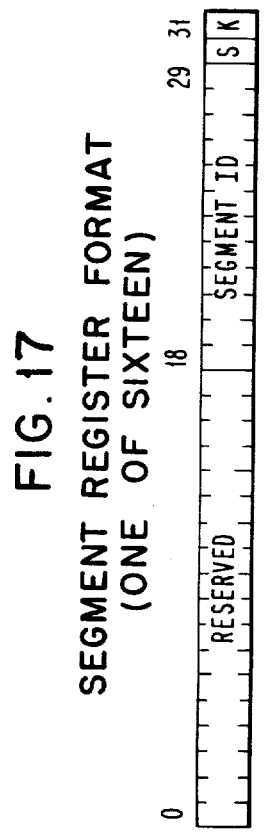
FIG. 17 is a diagrammatic illustration of the contents of one of the sixteen Segment Registes.

The sixteen Segment Registers provided contain the Segment Identifier, Special Bit, and Key Bit. The 12-bit Segment Identifier specifies one of 4096 256M-byte virtual storage segments. The Special Bit indicates that this is a special segment and lockbit processing applies. The Key Bit indicates the level of access authority associated with the currently executing task with respect to storage accesses with the given segment. The format of each Segment Register is shown in FIG. 17.

The content of each Segment Register is defined as follows:

Bits 0.17: Reserved.

Bits 18:29: Segment Identifier. This 12-bit quantity specifies one of 4096 256M-byte virtyal storage segments.

Bit 30: Special Bit. This bit is set to one for special segments, and set to zero for non-special segments.

Bit 31: Key Bit. This bit determines the level of access authority of the currently executing task for accesses within the given segment. Use of this bit for storage access control is described in Section 6.1.

In the herein disclosed embodiment, each of the two TLBs contain sixteen entries which provide the necessary translation and control information for the conversion of a virtual address to a real address. In addition, each TLB entry contains additional information used for storage access control. Since the TLB contents are automatically updated from the main storage page table by hardware, writing of the TLB entry followed by a read will not necessarily read the same data which was written. Also, altering TLB entries can cause unpredictable results since the correspondance between virtual and real addresses will be destroyed. Access to the TLB contents is provided for diagnostic purposes only, and should only be made in non-translated mode. A write to a TLB entry in non-translated mode with all other translated accesses disabled, followed by a read, will read the same data that was written.

Each TLB entry is logically a 66-bit quantity (excluding reserved bits) compared of a 25-bit address tab, a 13-bit real page number, a valid bit, a 2-bit key, a write bit, an 8-bit transaction ID, and 16 lockbit. Each TLB entry is partitioned into three fields which are individually addressable. The format for each of the TLB fields are described below.

The "TLB Address Tag" field contains the high-order 25 bits of the segment identifier || virtual page index for 2K pages, and the high-order 24 bits for 4K pages. The format of the Address Tag field for each TLB entry is shown in FIG. 18.1.

The content of each TLB Address Tab field is defined as follows:

Bits 0:2: Reserved.

Bits 3:27: Address Tag. This field contains high-order 25 bits of the segment identifier || virtual page index for 2K pages, and the high-order 24 bits for 4K pages. For 4K pages, the Address Tag is contained in bits [3:26].

Bits 28:31: Reserved.

The "TLB Real Page Number, Valid bit (V), and Key bits (key)" field contains the real page number assigned to the virtual address contained in the Address Tag Field of the TLB entry. This field also includes a Valid Bit to indicate the given TLB entry contains valid information, and Key Bits for the access authority required for a given page. The format of this field for each TLB entry is shown in FIG. 18.2.

The content of the Real Page Number, Valid, and Key Bits field is defined as follows:

Bits 0:15: Reserved.

Bits 16:28: Real Page Number. This 13-bit field specifies one of 8192 real pages. If less than 8192 pages are implemented, only those low-order bits required to address the number of implemented pages are used.

Bit 29: Valid Bit. This bit is a one when the selected TLB entry contains valid information. This bit is a zero if the TLB entry contains invalid information.

Bits 30:31: Key Bits. This 2-bit field defines the access authority for each page. Use of the Key bits are described in Section 6.1.

The "TLB Write Bit, Translation ID, and Lockbits" field contains the Write Bit, Transaction ID, and Lockbits assigned to the virtual address contained in the Address Tag field of the TLB entry, if the TLB entry is for a special segment. The format of this field for each TLB entry is shown in FIG. 18.3.

The content of each TLB Write Bit, Transaction ID, and Lockbit field is defined as follows:

Bits 0:6: Reserved.

Bit 7: Write Bit. This bit defines the access authority associated with each page for special segments. Use of this bit in lockbit processing is described subsequently.

Bits 8:14: Transaction Identifier. This 8-bit field defines the task which currently owns the selected page within a special segment. Use of these bits in lockbit processing are described previously.

Bits 15:31: Lockbits. This 16-bit field defines the access authority for each "line" within a 2K or 4K page for special segments. A line is 128 bytes for 2K pages, and 256 bytes for 4K pages. Use of these bits in lockbit processing are described subsequently.

The present translation mechanism provides hardware support for frequently required translation functions. This hardware provides the ability to selectively invalidate TLB entires, and to perform a "load real address" function similar to that provided by the IBM System/370 family of computers.

As changes to the virtual-to-real address mapping are made, it is necessary for system software to synchronize the contents of the TLBs with the contents of the page table in main storage. Entries in both the TLBs and page frame tables must be purged (invalidated) to ensure that obsolete mapping information as not used for a subsequent translation.

The present system provides three functions to assist in the synchronization of TLB entries with the contents of the page table in main storage. There functions can be used to invalidate the entire TLB contents, or to invalidate only selected TLB entries. These functions are invoked by I/O write instructions (IOW) directed to specific I/O addresses within the 64K byte block of I/O addresses recognized by the system. Address assignments for each of these functions will be given to the system as required.

"Invalidate Entire TLB" function causes all TLB entires to be invalidated. This will force the TLB contents to be updated from page tables in main storage for subsequent translations.

An I/O write to the address associated with this function causes all TLB entries to be invalidated. The data transferred by the I/O write instruction is not used.

An "Invalidate TLB Entires in Specified Segment" function causes all TLB entries with the specified segment identifier to be invalidated. Subsequent translations using this segment identifier will cause the TLB contents to be updated from page tables in main storage.

An I/O write to the address associated with the function causes TLB entries with the specified segment identifier to be invalidated. Bits [0:3] of the data transferred by the I/O write instruction are used to select the segment identifier. All TLB entries containing this segment identifier are invalidated. Subsequent translations with an effective address within the invalidated segment will cause the TLB contents to be updated from the page table in main storage.

The "Invalidate TLB Entry for Specified Effective Address" function causes the TLB entry with the specified effective address to be invalidated.

Subsequent translations with an effective address within the page containing the specified effective address will cause the TLB contents to be updated from the page table in main storage.

An I/O write to the address associated with this function causes the TLB entry with the specified effective address to be invalidated. Bits [0:31] of the data transferred by the I/O write instruction are used as the effective address. The normal translation process is applied using the segment register contents contained in the present address translation mechanism.

The "Compute Real Address" function is used by system software to determine if a given virtual address is currently mapped in real storage, and what real address is assigned to the virtual address if it is mapped.

If a virtual address is not mapped, then its use would cause a page fault; this information may be important to the system routines running with interrupts disabled. The result of the virtual-to-real translation is required by system I/O routines, since most I/O operations are performed using real storage addresses.

The compute Real Address function is invoked by an I/O write to the address associated with this function. Bits [0:31] of the data transferred by the I/O write instruction are used as the effective address. This effective address is then used for the normal translation process, except the results of translation are loaded into the Translated Real Address Register (FIG. 15) (TRAR), rather than being used to access storage. The TRAR contains a bit indicating whether the translation was successful, and the corresponding real storage address if the translation was successful. Normal storage protection processing and lockbit processing are included in the indication of successful translation. Results of the Compute Real Address function are obtained by an I/O read of the TRAR.

A 64K-byte block of I/O addresses are assigned to the translation system. This 64K-byte block begins at an I/O address specified by the I/O Base Address Register. The I/O base address is defined to be on 65k boundaries. The I/O address assignments listed in Table IX are displacements in the specified 64K-byte block. The absolute I/O address is equal to the I/O base address plus the displacement.

TABLE IX

| Displacement | Assignment |
|---|---|
| 0000 thru 000F | Segment Registers 0 through 15. |
| 0010 | I/O Base Address Register |
| 0011 | Storage Exception Register |
| 0012 | Storage Exception Address Register |
| 0013 | Translated Real Address Register |
| 0014 | Transaction ID Register |
| 0015 | Translation Control Register |
| 0016 | RAM Specification Register |
| 0017 | ROS Specification Register |
| 0018 | RAS Mode Diagnostic Register |
| 0019 thru 001F | Reserved |

TABLE IX-continued

| Displacement | Assignment |
|---|---|
| 0020 thru 002F | TLB0 Address Tag Field for TLB0 entries 0 through 15. |
| 0030 thru 003F | TLB1 Address Tag Field for TLB0 entries 0 through 15. |
| 0040 thru 004F | TLB0 Real Page Number, Valid Bit, and Key Bits for TLB0 entries 0 through 15. |
| 0050 thru 005F | TLB1 Real Number, Valid Bit, and Key Bits for TLB0 entries 0 through 15. |
| 0060 thru 006F | TLB0 Write Bit, Transaction ID, and Lockbits for TLB0 entries 0 through 15. |
| 0070 thru 007F | TLB1 Write Bit, Transaction ID, and Lockbits for TLB0 entries 0 through 15. |
| 0080 | Invalidate Entire TLB. |
| 0081 | Invalidate TLB Entries in Specified Segment. |
| 0082 | Invalidate TLB Entry for Specified Effective Address. |
| 0083 | Load Real Address. |
| 0084 thru 0FFF | Reserved. |
| 1000 thru 2FFF | Reference and Change bits for pages 0 through 8191. |
| 3000 thru FFFF | Reserved. |

CONCLUSIONS

It will be apparent from the above description of the preferred embodiment of the invention, that many changes in the form and details of the system hardware and software may readily be made by those skilled in the art without departing from the spirit and scope of the present invention, which includes the usual segmenting scheme and the provision of lockbits in both the TLBs and in the page frame tables. These changes could obviously include, but are not limited to changes in the memory size, register sizes and control field designation, address size, page frame table accessing methods and organization, and hash addressing methods to name but a few.

Having thus described our invention, what we claim as new, and desire to secure by Letters Patent is:

1. A method for converting virtual memory addresses supplied by an associated central processing unit into real memory addresses within a large hierarchical memory system wherein the virtual memory address space is significantly larger than the actual memory which method comprises;

the CPU generating a first virtual address comprising a segment identifier field, a page offset field, and a byte offset field, utilizing the segment identifier field to access a set of segment registers pointed to by the segment identifier field, accessing the contents of the addressed segment register and concatenating the contents of same with the page offset and byte offset fields of said first virtual address to form a significantly larger second virtual address, wherein portions of said second virtual address obtained from said segment registers and the page offset portion of said first virtual address comprise a virtual page address to be utilized as a search argument in a subsequent address translation procedure which procedure comprises utilizing a subset of said virtual page address as the search argument in a set of high speed translation-look-aside buffers, comparing a complete virtual address stored at an accessed location of said translation look-aside buffers with the complete virtual address utilized as the search argument and accessing an associated real page address in the main memory from the translation look-aside buffers if the virtual address comparison is successful, in the event of an unsuccessful search for the virtual address in said translation look-aside buffers, continuing the search in a specified segment of storage in main memory (page frame tables) including hashing said virtual page address, accessing the page frame tables in main memory as a function at said hashed address, determining if the desired virtual address is at the hashed address and if not determining if the hashed address is the initial member of a linked list of virtual addresses, all of which would produce the same hashed address, continuing the search for the desired virtual address in said linked address list in said page frame tables until either the desired complete virtual address is found or it is determined that no such address is present, accessing the real page address associated with said complete virtual page address, if found, in said page frame tables and utilizing said real page address as the requested real memory address.

2. An address translation method as set forth in claim 1, including accessing additional access control bits stored in both said translation look-aside buffers and in the page frame tables associated with each translation entry for every virtual to real address translation stored therein, accessing a plurality of lock bits stored in either said translation look-aside buffers or in the page frame tables associated with each successfully translated page, said plurality of lock bits comprising a bit for each line within an associated real page and utilizing said lock bits to control copy back and journalling operations when the current version of data stored in memory is accessed by the CPU.

3. In a data processing system, including a CPU and a large hierarchical memory a method for translating virtual memory addresses into real memory address which comprises:

the CPU generating a first virtual address comprising a segment identifier portion, a page offset portion and a byte offset portion (within the page), using the sement identifier to access one of a plurality of segment registers pointed to by the segment identifier, each of which contains a second virtual address pointing to a large virtual block of data, combining said second virtual address with the page offset and byte offset portions of said first virtual address to form a third virtual address wherein said third virtual address is substantially larger than said first virtual address, utilizing said second virtual address and said page offset portion of said first virtual address as a virtual page search argument in a translation look-aside buffer (TLB) which comprises a very high speed searching mechanism for searching for a limited number of virtual addresses and for accessing real addresses stored therein which are translations of each related virtual address, accessing said TLBs utilizing a subset of the search argument as an address, comparing the virtual page search argument with the contents of a selected field of the accessed TLB, upon a successful comparison, utilizing a real page address stored therein as the translation of said virtual address and, accessing additional fields at the accessed location in said TLB for accessing and data persistence control information relevant to the data stored at the translated real page address, and if unsuccessful initiating a search in the page frame tables in main memory, which contain the real address corresponding to all virtual addresses utilized in the memory system at any point in time, generating an address in the page frame tables as a function of the virtual page search argument, accessing said page frame table at said generated address which address identifies the initial member of a linked list list of entries and comparing said virtual page search argument with a virtual page identifier stored at each entry storage location in said page frame tables until a successful comparison occurs.

4. An address translation method as set forth in claim 3 including: retrieving the real page address, stored in and associated with a successful search, from the page frame tables together with the access and data persistence control information stored therewith and transferring said translation and control information to an appropriate storage location in the TLBs.

5. An address translation method as set forth in claim 4 wherein said step of generating an address in the page frame tables includes generating a hash function of the virtual page search argument and utilizing said hash function as at least a portion of the address to a particular subset of said page frame tables.

6. In a high speed electronic data processing system including a central processing unit (CPU) and a large hierarchical memory system provided with a virtual addressing space significantly larger than the actual memory, the improvement which comprises an address translation mechanism for converting virtual addresses into real memory addresses including, means for generating a first virtual address which comprises a segment identifier field, a page offset field and a byte offset field, a plurality of segment registers and means for loading same under program control with a second virtual address identifying a large virtual block of data, means for accesssing one of said segments registers specified by said segment identifier field of said first virtual address, means for concatenating the virtual address from the specified segment register with the page offset and byte offset fields of said first virtual address to form a large virtual effective address comprising an effective page address portion and a byte offset portion, a high speed translation look-aside buffer system for storing address translation data for most recently used virtual accesses to the memory hierarchy, means for utilizing at least a portion of said effective page address to access the translation look-aside buffer system to determine is said effective page address has been previously translated and, if so, means for accessing the real page address from the translation look-aside buffer as the result of the translation process.

7. an address translation mechanism as set forth in claim 6 wherein said translation look-aside buffer system includes a plurality of storage locations each of which includes means for storing; the complete virtual page address for a particular translation, the complete real page address, and memory access and data persistence control data relevant to the particular real page of data, means for comparing the complete effective page address which caused access of a particular storage location of the translation look-aside buffer with the virtual page address stored therein, and in the page frame tables in main memory which contain all of the virtual to real address translations in the memory hierarchy if the search in the translation look-aside buffer system was unsuccessful.

8. An address translation mechanism as set forth in claim 7 including means for accessing the translation look-aside buffer system at an address computed from a subset of said effective page address whereby it is possible for many effective addresses to cause access of the same storage locations in said translation look-aside buffer.

9. An address translation mechanism as set forth in claim 7 wherein the means for continuing the search for a particular translation in the page frame tables includes means for hashing the effective page address to obtain an access address into the page frame tables, means for linking together all entries in the page frame tables which represent the virtual to real address translations of all those virtual page addresses which would hash to the same address, means for continuing the search for a particular effective page address in the linked list until either the address is found or it is determined not to be present, and means for transferring predetermined data relating to translation and memory control functions from the page frame tables to the appropriate location in the translation look-aside buffers concurrently with a successful translation which required using the page frame tables.

10. An address translation mechanism as set forth in claim 9 including means in said translation look-aside buffers and the page frame tables for storing N-lock bits in each storage location wherein N is the number of lines in a page of data stored in said memory system, means for accessing said lock bits under program control wherever an address translation operation occurs and means for utilizing said lock bits to control copy back and journaling operations when the lock bits indicate that the particular lines(s) of data must be retained in an original form for at least a predetermined period.

11. A high speed translation look-aside buffer (TLB) mechanism for use with a virtual to real address translation system comprising as many addressable storage locations therein as there are virtual to real address translation data entities, means in each storage location for storing;

a virtual address tag for comparison with a virtual address to be translated, the real address in memory of the data referenced by the above virtual address, access control and identifier data relating to the data, stored at said real address in memory, a series of "N" lock bits for use in insuring data persistence for a particular memory page wherein "N" is the number of lines in the page, p1 means for accessing said "N" lock bits stored in said translation look-aside buffers, said plurality of lock bits comprising a bit for each line within an associated real page and means for setting said lock bits to control copy back and journalling operations when the current version of data stored in memory is accessed by the CPU and means operable under program control for accessing or altering data stored in storage location in said TLB based on a subset of the virtual address to be translated.

12. A translation look-aside buffer as set forth in claim 11 including means for processing the lock bits accompanying any real page of data which is the subject of a successful translation operation to assure that copies of lines of data in the page designated by the lock bits are retained in storage in unaltered form.

* * * * *